(12) United States Patent
Nakamura et al.

(10) Patent No.: US 7,503,244 B2
(45) Date of Patent: Mar. 17, 2009

(54) MACHINE TOOL AND BED THEREOF

(75) Inventors: Teruhiro Nakamura, Toyota (JP); Hiroaki Kikuchi, Nagoya (JP); Eiji Fukuta, Chita-gun (JP); Kikutoshi Okada, Kariya (JP)

(73) Assignee: JTEKT Corporation, Osaka (JP)

( * ) Notice: Subject to any disclaimer, the term of this patent is extended or adjusted under 35 U.S.C. 154(b) by 338 days.

(21) Appl. No.: 10/860,157

(22) Filed: Jun. 4, 2004

(65) Prior Publication Data

US 2004/0255736 A1 Dec. 23, 2004

(30) Foreign Application Priority Data

| Jun. 17, 2003 | (JP) | ............................. 2003-171867 |
| Oct. 31, 2003 | (JP) | ............................. 2003-372977 |
| Oct. 31, 2003 | (JP) | ............................. 2003-372978 |

(51) Int. Cl.
*B23B 17/00* (2006.01)
*B23Q 1/00* (2006.01)

(52) U.S. Cl. ........................................ 82/149; 408/234
(58) Field of Classification Search .................... 82/149
See application file for complete search history.

(56) References Cited

U.S. PATENT DOCUMENTS

| 3,333,333 | A | * | 8/1967 | Noack | .......................... 29/604 |
| 3,783,741 | A | | 1/1974 | Schadebrodt et al. | |
| 5,325,750 | A | | 7/1994 | Carlyle et al. | |
| 6,188,150 | B1 | * | 2/2001 | Spence | ......................... 310/12 |
| 6,320,649 | B1 | * | 11/2001 | Miyajima et al. | ............. 355/72 |
| 7,061,588 | B2 | * | 6/2006 | Kubo | ........................... 355/72 |
| 2004/0255736 | A1 | | 12/2004 | Nakamura et al. | |

FOREIGN PATENT DOCUMENTS

| JP | 8-19962 | 1/1996 |
| JP | 8-206935 | 8/1996 |
| JP | 10-58252 | 3/1998 |
| WO | WO00/00323 | 6/2000 |

OTHER PUBLICATIONS

U.S. Appl. No. 11/500,970, filed Aug. 9, 2006, Saito et al.
Large Optics Diamond Turning Machine (LODTM) Lawrence Livermore National Laboratory 7000 East Ave., Livermore, CA 94550-9234 http://www-eng.llml.gov/lodtm/index.html, Dec. 14, 2006.

* cited by examiner

*Primary Examiner*—Willmon Fridie
(74) *Attorney, Agent, or Firm*—Oblon, Spivak, McClelland, Maier & Neustadt, P.C.

(57) ABSTRACT

It is an object of the present invention to provide a bed of a machine tool to be stably leveled and supported by three support points and to reduce the strain of the bed of which structure is simplified. The bed of the machine tool according to the present invention comprises three props and a ceiling 18. The props are arranged as a triangle. The ceiling is put on the props and supports at least one tool box and work saddle. In the triangle in view of horizontal plane, there exists center of gravity of the whole machine tool.

19 Claims, 10 Drawing Sheets

Prior Art

MACHINE TOOL AND BED THEREOF

INCORPORATION BY REFERENCE

The present application claims priority under 35 U.S.C. §119 to Japanese Patent Applications No. 2003-171867, filed on Jun. 17, 2003, No. 2003-372977, filed on Oct. 31, 2003 and No. 2003-372978, filed on Oct. 31, 2003. The contents of those applications are incorporated herein by references in their entirety.

BACKGROUND OF THE INVENTION

1. Field of the Invention

The present invention relates to a machine tool, e.g. a grinding machine, a machining center or a lathe, and a bed thereof.

2. Description of the Related Art

It is well known for a machine tool, e.g. a grinding machine, a machining center or a lathe, that includes a work saddle, a tool box and a bed. The work saddle carries a workpiece. The tool box carries one or more machining tools. The bed consists of a work saddle-base to support the work saddle and a tool box-base to support the tool box. Such bed forms the base of the machine tool and is horizontally supported by suitable support members, e.g. jacks or leveling blocks, when the bed is fixed.

Figure 1:
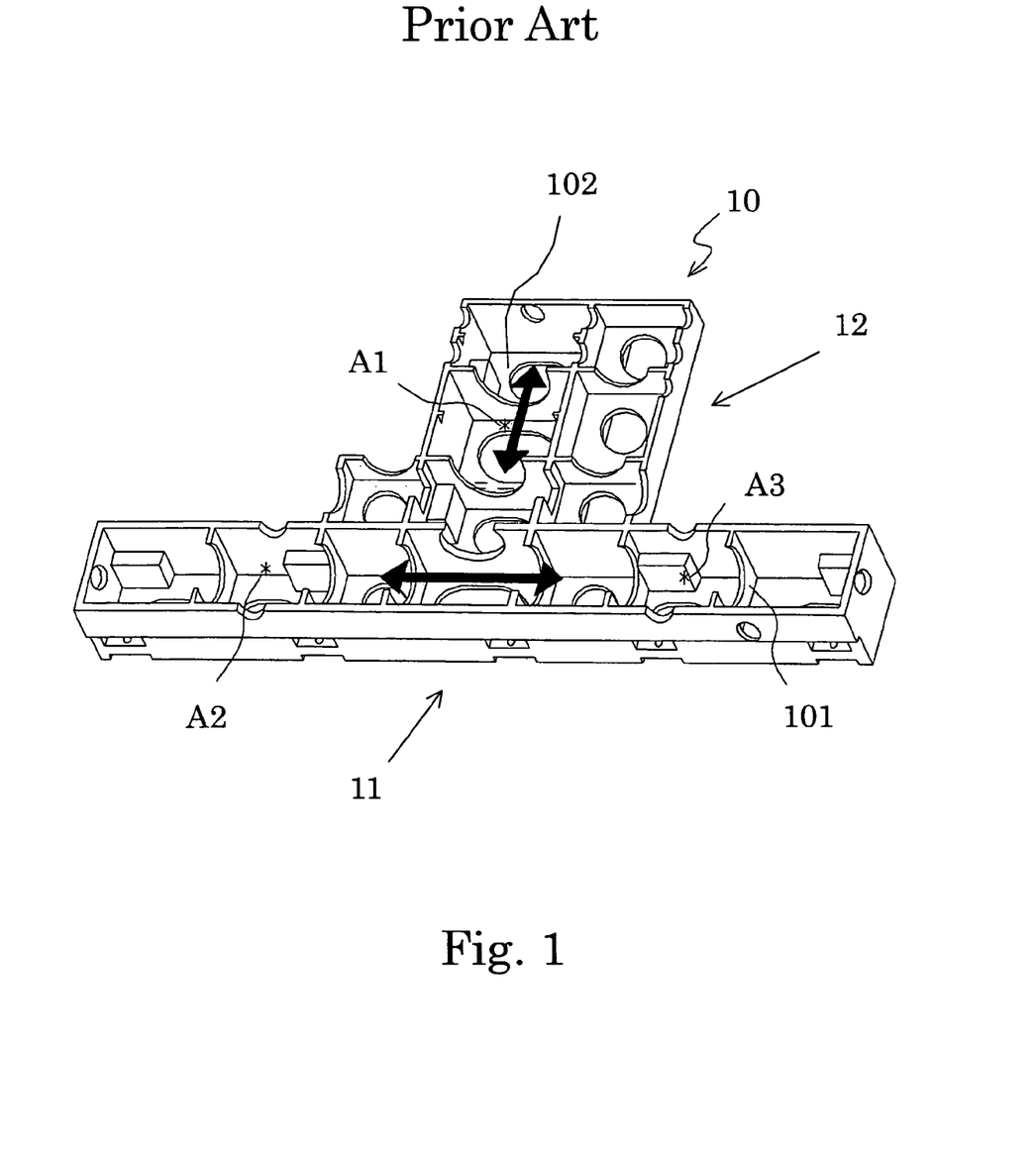
FIG. 1 is a perspective view of a bed of a machine tool according to the prior art.

Generally, as shown in FIG. 1, prior art of the bed 10 of the machine tool is hollow and is made from a suitable material, e.g. a casting. In the box-like bed 10, plural reinforcement ribs 101 are disposed suitably to make the bed 10 be higher rigidity, considering the weight of the devices installed thereon. A grinding machine will be explained as an example of the well-known machine tool hereafter. The grinding machine comprises the tool box of a wheel head and the work saddle, not shown in FIG. 1. The wheel head advances and retracts on the tool box-base 12. The work saddle traverses the direction of the wheel head advancing/retracting on the work saddle-base 11, and carries a head stock and a tail stock chucking a workpiece therebetween. The points A1, A2 and A3 respectively represent the center of gravity of the wheel head, the head stock and the tail stock and move along the arrows shown in FIG. 1.

A ceiling, not shown, is fixed on the bed 10 of the grinding machine. To install the wheel head and the work saddle with the head stock and the tail stock on the ceiling of the bed 10, the hollow bed 10 is latticed by plurality of the reinforcement ribs 101 arranged in two directions crossing at a right angle therein. Then, at support points of the bed 10, there are arranged the support members under a floor 102 of the bed 10. The support members level the bed 10 and adjust static displacement (strain) of the bed 10, and further adjust dynamic displacement of the grinding machine that will be generated during grinding. In the prior art, for example, the number of the support members is thirteen.

In the above-mentioned machine tool, however, since the support members receive the load of the machine tool, the reaction force occurs against the load at each of the support points of the bed 10. Therefore, the deflection of the bed 10 is the largest around each of the support points and becomes gradually smaller as each of the support points goes away. On the other hand, as each of the support points goes away, the strain of the bed 10 becomes larger. Namely, around the support points, the increase of the strain is large but the amount of the strain is small. In contrast, as each of the support points goes away, the increase of the strain becomes smaller but the amount of the strain becomes larger. The strain of the ceiling, an upper part of the bed 10, has to satisfy the tolerance zone of the strain when the machine tool is fixed, thereby the bed 10 is supported under the floor 102 by plurality of the support members to make its strain become smaller. To support the bed 10 of the machine tool of the prior art by plurality of the support members, the height of each of the support members has to be respectively adjusted when the bed 10 is fixed on the floor. Thus, fixing the bed 10 is complicated and spends much time.

Further in the prior art, although the bed 10 is latticed by plurality of the reinforcement ribs 101 in itself, such ribs 101 may not maintain enough rigidity so that plenty of the support members are also needed when the bed 10 is fixed. Particularly, in the case that one support point is not located just below the reinforcement ribs 101, the support member thereat occurs large strain of the bed 10. Or, although one support point is located just below one of the reinforcement ribs 101, in the case that the reinforcement rib 101 is only for the rigidity of the bed 10 and does not support the ceiling, the support member thereat also occurs large strain of the bed 10. Nobody pays attention to the above-mentioned problem that plenty of the support members are used in order to make the strain of the bed 10 become smaller and satisfy the tolerance zone thereof.

As described above, the bed 10 of the prior art is supported and leveled by plenty of the support members adjusted respectively, thereby leveling the bed 10 requires great skill and spends time. Further, regular maintenance to level the bed 10 is required in order to compensate the aged deterioration. Furthermore, considering and bearing the weight of the wheel head, the head stock and the tail stock, the bed 10 forms T-like and box-like exterior, and forms plurality of the reinforcement ribs 101 therein, whereby the shape of the bed 10 and its die for molding are complicated. Because of the complication, the strain of whole bed 10 is also complicated. Therefore, the bed 10 may be costly in its production and may be unsatisfactory in its working accuracy.

Now, it is known that stuff can be leveled when supported by three support points. So, it may be considered that the bed 10 of the machine tool is also supported by three support points so as to reduce the number of the support points, thereby it is expected that fixing the bed 10 will be simplified and its time will be shortened. However, the bed 10 is unstably supported by means of simple support at three points, because the center of gravity of the machine tool moves according to the movable tool box or/and work saddle thereon. In such machine tool, the tool box and the work saddle relatively move on the bed 10 in order to machine the workpiece, so that the center of gravity of whole machine tool may go out of the triangle formed by three support points and the machine tool becomes unstable. That particularly happens to the machine tool of which center of gravity is widely moved by movement of the device(s), the tool box or/and the work saddle, on the bed 10, especially the device(s) being heavy, e.g. tool-box/work saddle with a motor thereon or plural tool boxes/work saddles. That is why the bed 10 supported by three points is not used for the prior art of the machine tool shown in FIG. 1.

SUMMARY OF THE INVENTION

In view of the previously mentioned circumstances, it is an object of the present invention to provide a machine tool and a bed thereof to be stably leveled and supported by three support points.

It is second object of the present invention to provide the machine tool and the bed thereof to reduce the strain of the bed of which structure is simplified.

It is third object of the present invention to provide the machine tool and the bed thereof to reduce the number of support points of the bed so as to simplify and to shorten fixing the bed.

In order to achieve the above and other objects, the present invention provides a machine tool comprising:
a bed including three props and a ceiling put on said props;
at least one tool box and work saddle arranged on said ceiling; and
wherein center of gravity of said whole machine tool exists inside a triangle linking said props in view of horizontal plane.

Further aspect of the present invention is that a bed of a machine tool comprises;
three props;
a ceiling put on said props and supporting at least one tool box and work saddle; and
wherein center of gravity of said whole machine tool exists inside a triangle linking said props in view of horizontal plane.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

Figure 2:
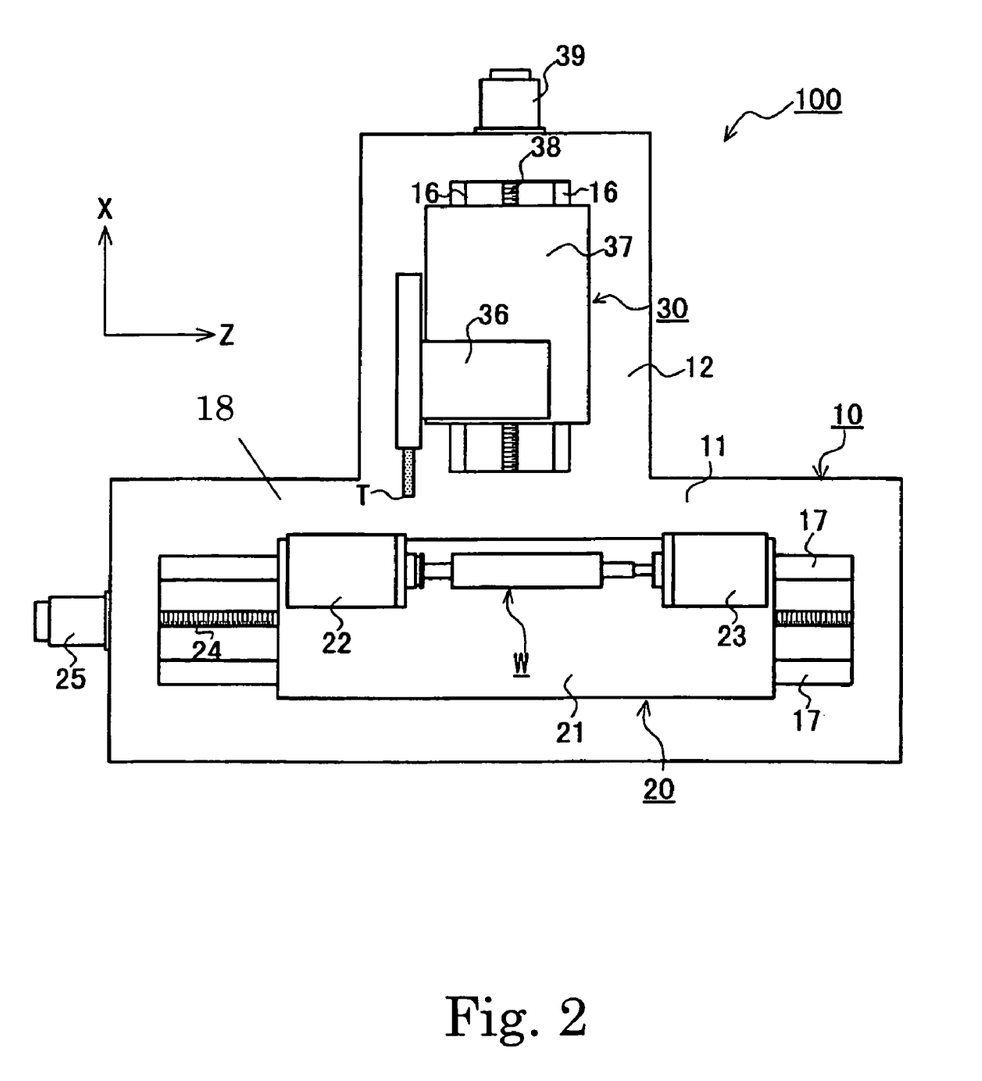
FIG. 2 is a plain view of a machine tool according to first embodiment of the present invention.
Figure 3:
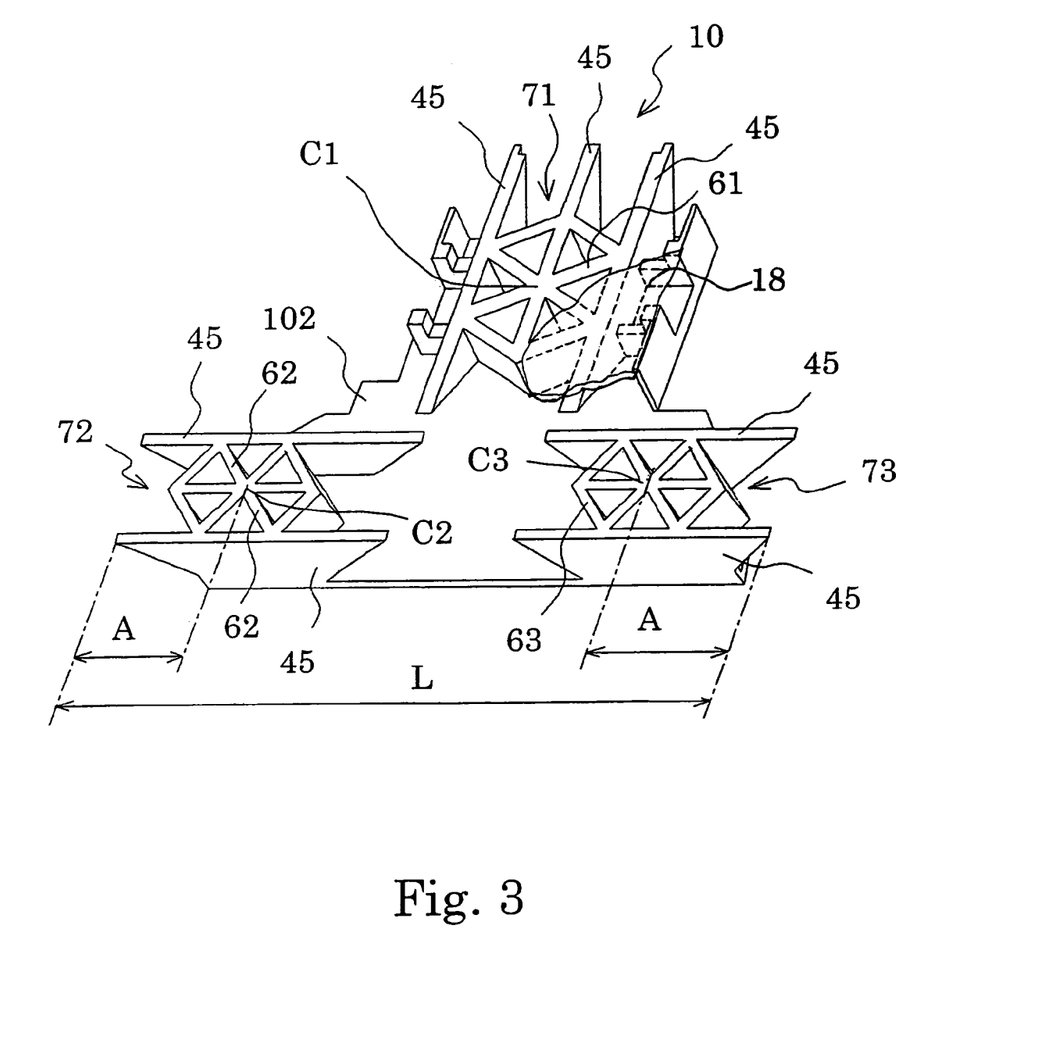
FIG. 3 is a perspective view of a bed of the machine tool according to the first embodiment.

A first preferred embodiment of a machine tool and a bed thereof according to the present invention will be described referring to FIGS. 2 and 3. As shown in FIGS. 2 and 3, a machine tool 100 according to the first embodiment includes a work saddle 20 supporting a workpiece W, a tool box 30 supporting a machining tool T and a bed 100 as a base of the machine tool 10. In the first embodiment, the machine tool 100 is a cylindrical grinding machine of which work saddle 20 supports and rotates the workpiece W and of which tool box 30 carries and rotates a machining tool of a grinding wheel T.

The bed 10 is T-formed and is covered by a ceiling 18 formed the same. The bed 10 of the machine tool 100 is made from a work saddle-base 11 to support the work saddle 20 and a tool box-base 12 to support the tool box of a wheel head 30. On the ceiling 18, one pair of slide ways 17, 17 exists along Z-axis in the work saddle-base 11 and another pair of slide ways 16, 16 exists along X-axis in the tool box-base 12. The work saddle 20 is arranged on the slide ways 17, 17 and moves along the Z-axis by a drive device including a ball screw 24 and a servomotor 25. The work saddle 20 carries a work table 21. The tool box of a wheel head 30 is arranged on the slide ways 16, 16 and moves along the X-axis by a drive device including a ball screw 38 and a servomotor 39. The wheel head 30 carries a wheel slide 37 equipping a wheel spindle 36 thereon.

On the work saddle 20, there is arranged the work table 21 on which a head stock 22 is fixed at one side and on which a tail stock 23 is movably attached at the other side. The head stock 22 comprises a work spindle, a motor attached at one end of the work spindle and a chuck attached at the other end of the work spindle. Thereby the workpiece W is supported between the chuck of the head stock 22 and the tail stock 23 and rotates around the center of the work spindle of the head stock 22. The wheel head 30 carries the wheel slide 37 thereon and moves along the X-axis, namely toward the workpiece W. The wheel spindle 36 is rotatably attached on the wheel slide 37 and fixes the grinding wheel T at one end thereof.

In general for the grinding machine 100, the wheel head 30, head stock 22 and tail stock 23 mainly weigh against the bed 10. Therefore, one object of the embodiment is to provide the bed 10 of which strain is reduced against the center of gravity of the wheel head 30, the head stock 22 and the tail stock 23.

The bed 10 of the machine tool 100 is made from cast iron or steel plates welded each other. As shown in FIG. 3, the bed 10 comprises a floor 102, three hollow prism-like props 71, 72 and 73 suitably formed on the floor 102, three diagonal-like props 61, 62, and 63 formed in the hollow prism-like props 71 to 73 and the ceiling 18 (see FIG. 2) put on the props 61-63, 71-73. On the bed 10, the ceiling 18 is supported at three regions by the props 61-63 and 71-73. Reinforcement ribs 45 are suitably formed around the props 61-63, 71-73 on demand so that the bed 10 is strengthened by the props 61-63, 71-73 and the reinforcement ribs 45. In the first embodiment, prism-like props 71-73 are hollow hexagonal prisms in which the diagonal-like props 61-63 exist, thereby the props 61-63, 71-73 form honeycombs parted every sixty degrees.

The centers of the props C1, C2 and C3 are determined as explained below.

(A): There is arranged center of gravity of the whole grinding machine 100 inside the triangle linking the centers of the props C1, C2 and C3 in consideration of the movement of wheel slide 37 on the wheel head 30 and the work table 21 on the work saddle 20.

(B): It is hypothesized that the work saddle-base 11 along the Z-axis is a beam of which length is L and on which equal distributed load acts. The centers of the props C2, C3 as the support points for the work table 21 are arranged where the strain of the beam is minimized. There is difference of length A, a quarter of L, between each end of the work saddle-base 11 as the beam and each center C2, C3. Namely, each of the centers of the props C2, C3 is located where each of the length A is 0.25 L from each of the ends of the work saddle-base 11 of which length is L.

(C): The centers of the props C2, C3 for the work saddle 20 are arranged to support the moving work saddle 20 and not to incline the work saddle 20.

On both opposite sides of the prism-like props 71-73 in directions of the movement of the wheel head 30 and the work saddle 20, there exist the reinforcement ribs 45. Each of the reinforcement ribs 45 shapes an inverted trapezoid and supports the ceiling 18 with the props 61-63, 71-73. Namely, on the tool box-base 12, the inverted trapezoid-like reinforcement ribs 45 are unitedly formed with the hollow prism-like prop 71 in direction of the movement of the wheel head 30 along the X-axis. Also, on the work saddle-base 11, the inverted trapezoid-like reinforcement ribs 45 are unitedly formed with the hollow prism-like props 72 and 73 in direction of the movement of the work table-slide 20 along the Z-axis. So, the props 61-63, 71-73 and reinforcement ribs 45 on the floor 102 support the ceiling 18. In addition, on the tool box-base 12, further reinforcement rib 45 is formed on one peak of the prism-like prop 71 at the end of the bed 10 in direction of the movement of the wheel head 30 along the X-axis.

According to the inverted trapezoid-like reinforcement ribs 45, where at least one device on the bed 10 (e.g. tool box 30 or work saddle 20) moves, its weight can be supported by the props 61-63, 71-73. Namely, the props 61, 71 support the moving wheel head 30, and the props 62, 72 and 63, 73 distributively support the moving work saddle 20. The shape of the inverted trapezoid-like reinforcement ribs 45, its length of base/top and its thickness, is defined by the weight of stuff put on the ceiling 18 and the strain of the props 61-63, 71-73.

Figure 5:
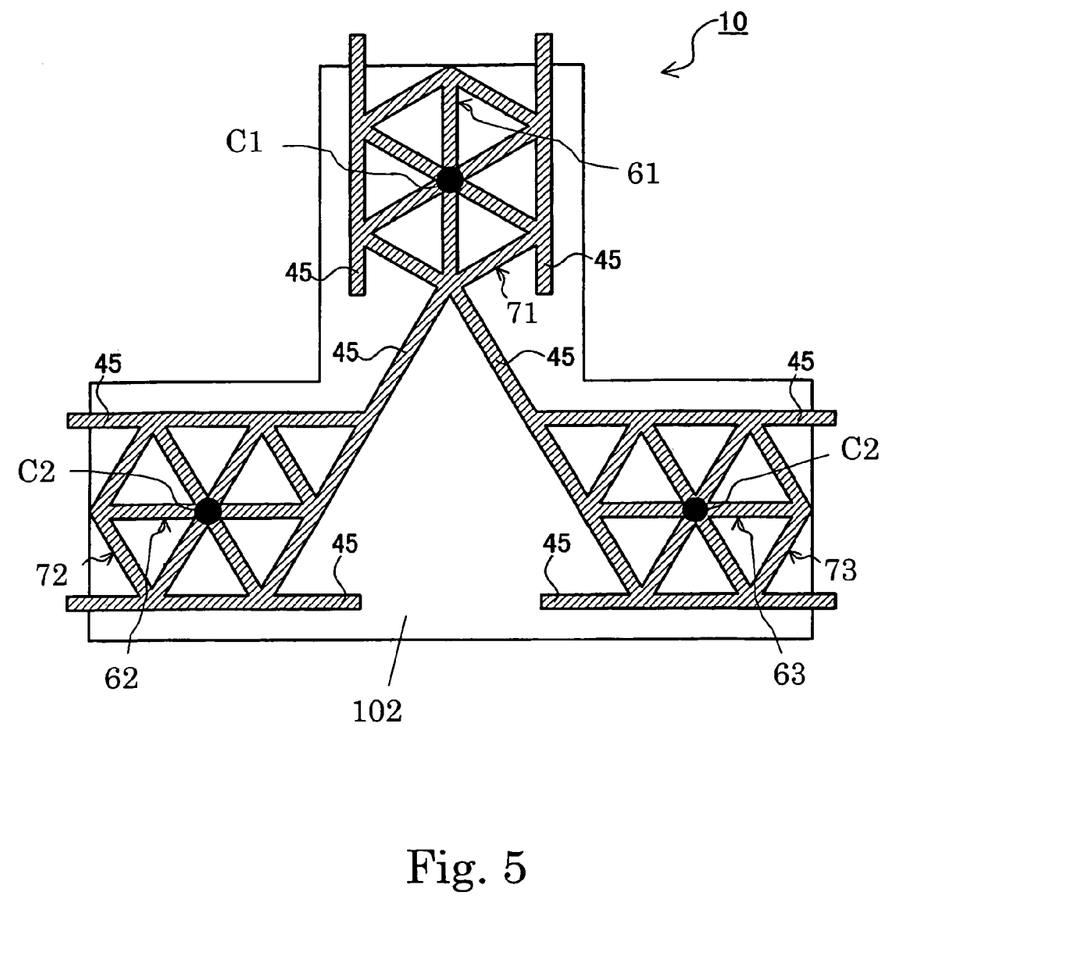
FIG. 5 is a plain view of a bed of a machine tool according to third embodiment of the present invention.

In the embodiment, the prism-like props 71-73 and the reinforcement ribs 45 form the honeycomb that is built up from plural triangles combined each other in the plain view of FIG. 5. The honeycomb can be also explained that plural hexagons made from six triangles are suitably arranged. The bed 10 of the third embodiment comprises the ceiling 18, the floor 102, the props 61-63, 71-73 and the reinforcement ribs 45, wherein the ceiling 18 is supported over the floor 102 by the props 61-63, 71-73 and the reinforcement ribs 45.

In the case that the machine tool 100 is fixed to the required place, the bed 10 is suitably supported and leveled by support members. In the embodiment, only three support members are used in order to support and level the bed 10 under the floor 102. Each of the support members is disposed under the prism-like props 71-73 and the diagonal-like props 61-63, and supports the bed 10 of each of the centers of the props C1, C2 and C3. According to such support points, each of the bending moment of the bed 10 about each center C1-C3 is reduced so as to reduce the deflection and/or the strain of the ceiling 18.

The bed 10 is supported and leveled by the three support members where the machine tool 100 is fixed. The support points of the support members respectively correspond to the centers of the props C1 to C3, especially to the center axes of the prism-like props 71-73 and the diagonal-like props 61-63. In other words, where the machine tool 100 is fixed, the three support members are respectively arranged under the props 61-63, 71-73 and support the bed 10.

As described above, the machine tool 100 is supported by the three support members though, the prior art needs more support members, e.g. thirteen, so as to reduce the number of the support members. Further, The bed 10 is made from the floor 102, the props 61-63, 71-73, the reinforcement ribs 45 and the ceiling 18, thus forms box-like. The props 61-63, 71-73 with the reinforcement ribs 45 are constructed on the T-formed floor 12 in consideration of the movement of the tool box 30 and/or work saddle 20, and support the machine tool 100 at those three regions. By means of such support, the strain of the bed 10 is reduced in comparison with the prior art. And the weight of the bed 10 is reduced, because there is made a large space in the bed 10.

Figure 4:
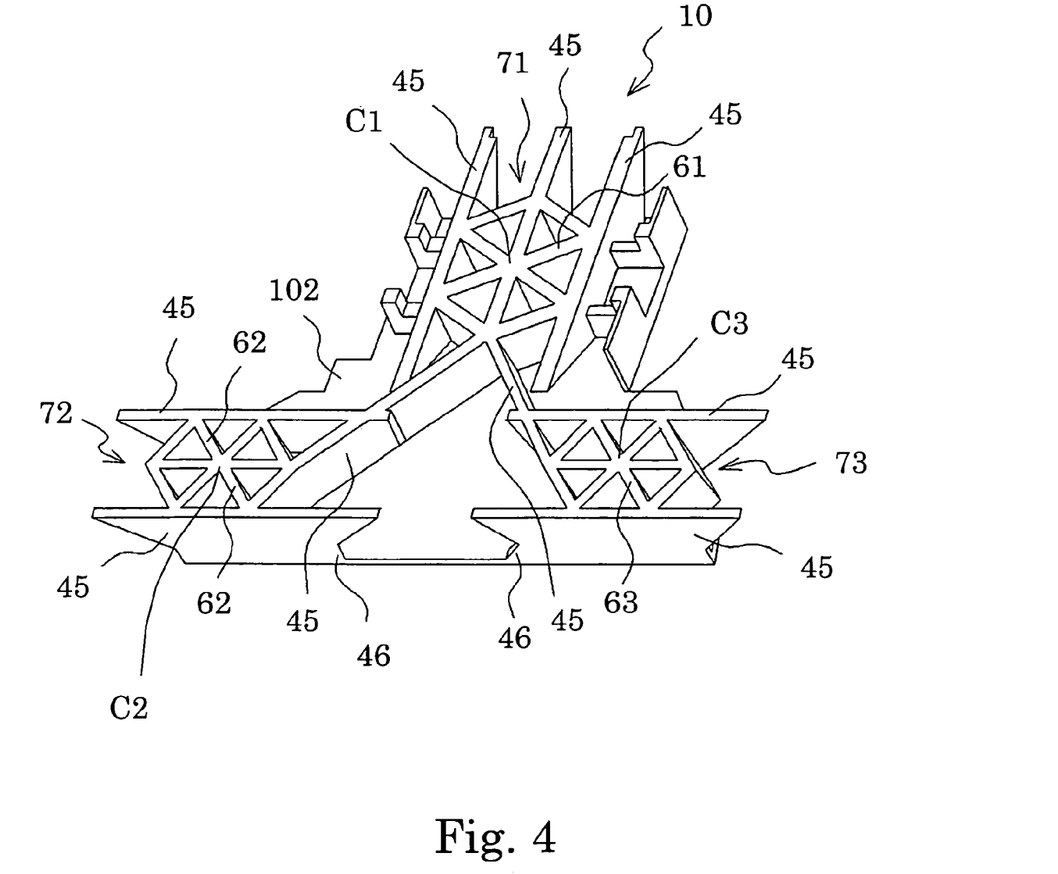
FIG. 4 is a perspective view of a bed of a machine tool according to second embodiment of the present invention.

Second embodiment will be explained referring to FIG. 4. The same numerals in the second embodiment to that in the first embodiment of the present invention are same constructions except for a part so that the explanations of the same numerals are omitted.

The second embodiment provides the bed 10 of which strain is more reduced in up and down direction. For such way, it is preferable that the front opening and the central space of the bed 10 would be reinforced as shown in FIG. 4. To reinforce the front opening of the bed 10, padding portions 46 are formed at the joint between the floor 102 and the inverted trapezoid-like reinforcement ribs 45 next to the front opening. The padding portions 46 can be also accommodated to the other reinforcement ribs 45. To reinforce the central space of the bed 10, further reinforcement ribs 45 are suitably formed to connect the peaks of the prism-like props 71-73 each other in the central space on the floor 102.

Since the reinforcement ribs 45 are connected with the prism-like props 71-73 and the floor 102 in the central space, the bed 10 becomes more strengthened so as to reduce its strain. Further, the reinforcement ribs 45 are plates so as to gain its weight little.

Third embodiment will be explained referring to FIG. 5. The same numerals in the third embodiment to that in the first and second embodiments of the present invention are same constructions except for a part so that the explanations of the same numerals are omitted. The third embodiment is similar to the second embodiment, but padding portions 46 and one reinforcement rib 45 are only omitted from the second embodiment.

Figure 6:
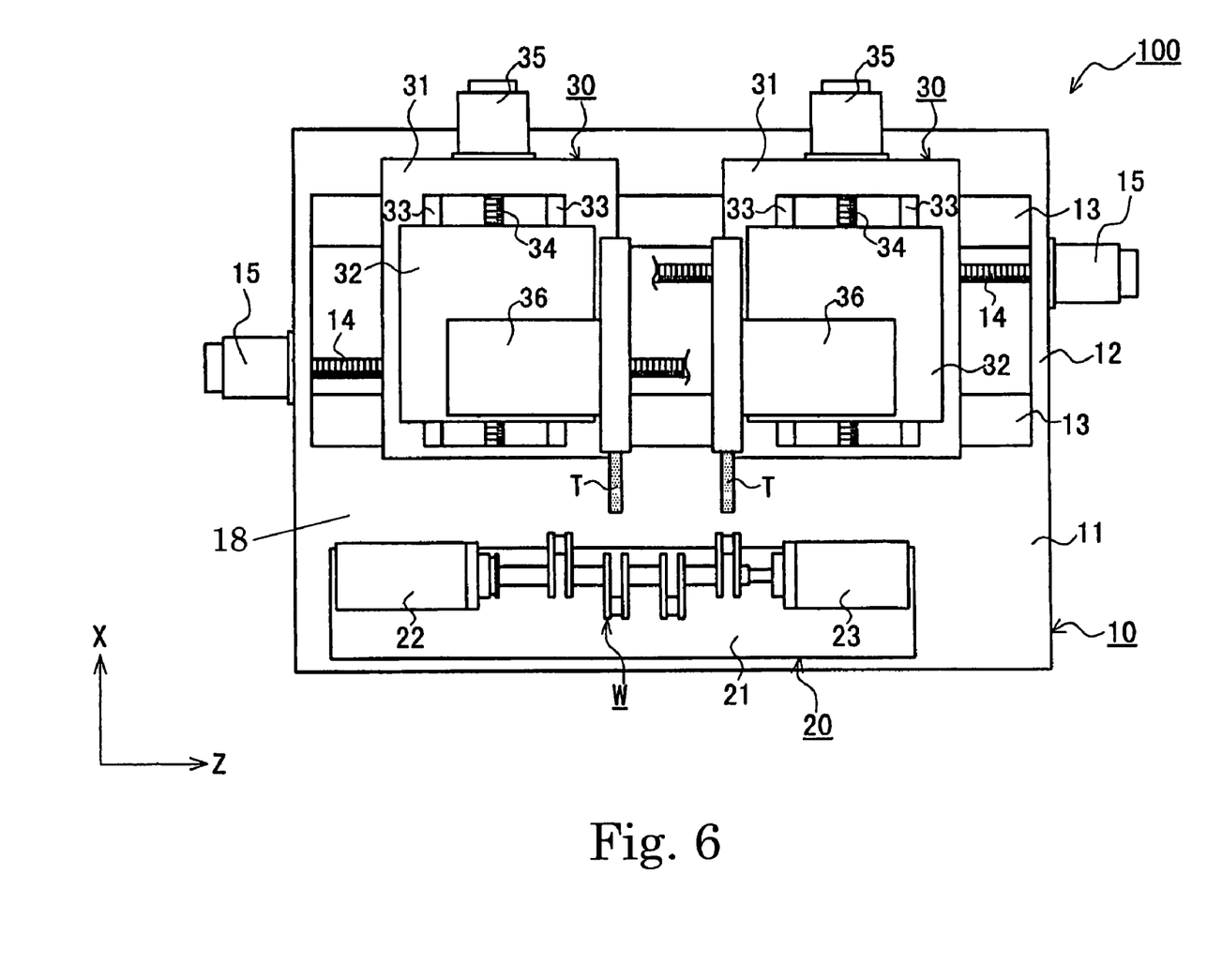
FIG. 6 is a plain view of a machine tool according to fourth embodiment of the present invention.

Fourth embodiment will be described referring to FIGS. 6 to 8. A machine tool 100 comprises a work saddle 20 to support a workpiece W, a pair of tool boxes of wheel heads 30, 30 with a pair of machining tools of grinding wheels T, T and a bed 10 as a base of the machine tool 100. In the fourth embodiment, the machine tool 100 indicates a grinding machine to grind crankpins of a crankshaft as the workpiece W, thereby the work saddle 20 supports and rotates the workpiece W. Each of the wheel heads 30, 30 supports and rotates each of the grinding wheels T, T.

The work saddle 20 comprises a work table 21 fixed on the bed 10, a head stock 22 fixed on one end of the work table 21 and a tail stock 23 movably arranged on the other end of the work table 21. The head stock 22 and the tail stock 23 support the workpiece W therebetween. The head stock 22 comprises a work spindle, a motor attached at one end of the work spindle and a chuck attached at the other end of the work spindle. Thereby the workpiece W supported by the work saddle 20 rotates around the center of the work spindle of the head stock 22.

A pair of the wheel heads 30, 30 respectively comprise a pair of first slides 31, 31 movably arranged on the bed 10 in direction of the rotational axis of the workpiece W along Z-axis, a pair of second slides 32, 32 movably arranged on the first slides 31, 31 toward the workpiece W along X-axis and a pair of wheel spindles 36, 36 which support and rotate a pair of the grinding wheel T, T. Each of the first slides 31, 31 moves by a ball screw 14 and a servomotor 15 on a pair of slide ways 13, 13 formed on a tool box-base 11 of the bed 10 along the Z-axis. Each of the second slides 32, 32 moves by a ball screw 34 and a servomotor 35 on a pair of slide ways 33, 33 formed on the first slide 31 along the X-axis.

The bed 10 comprises a work saddle-base 11 to support the work saddle 20 and a tool box-base 12 to support the two wheel heads 30, 30 aligned along the Z-axis. In plain views of FIGS. 6 and 7, the work saddle-base 11 is arranged downward and the tool box-base 12 is arranged upward.

Figure 7:
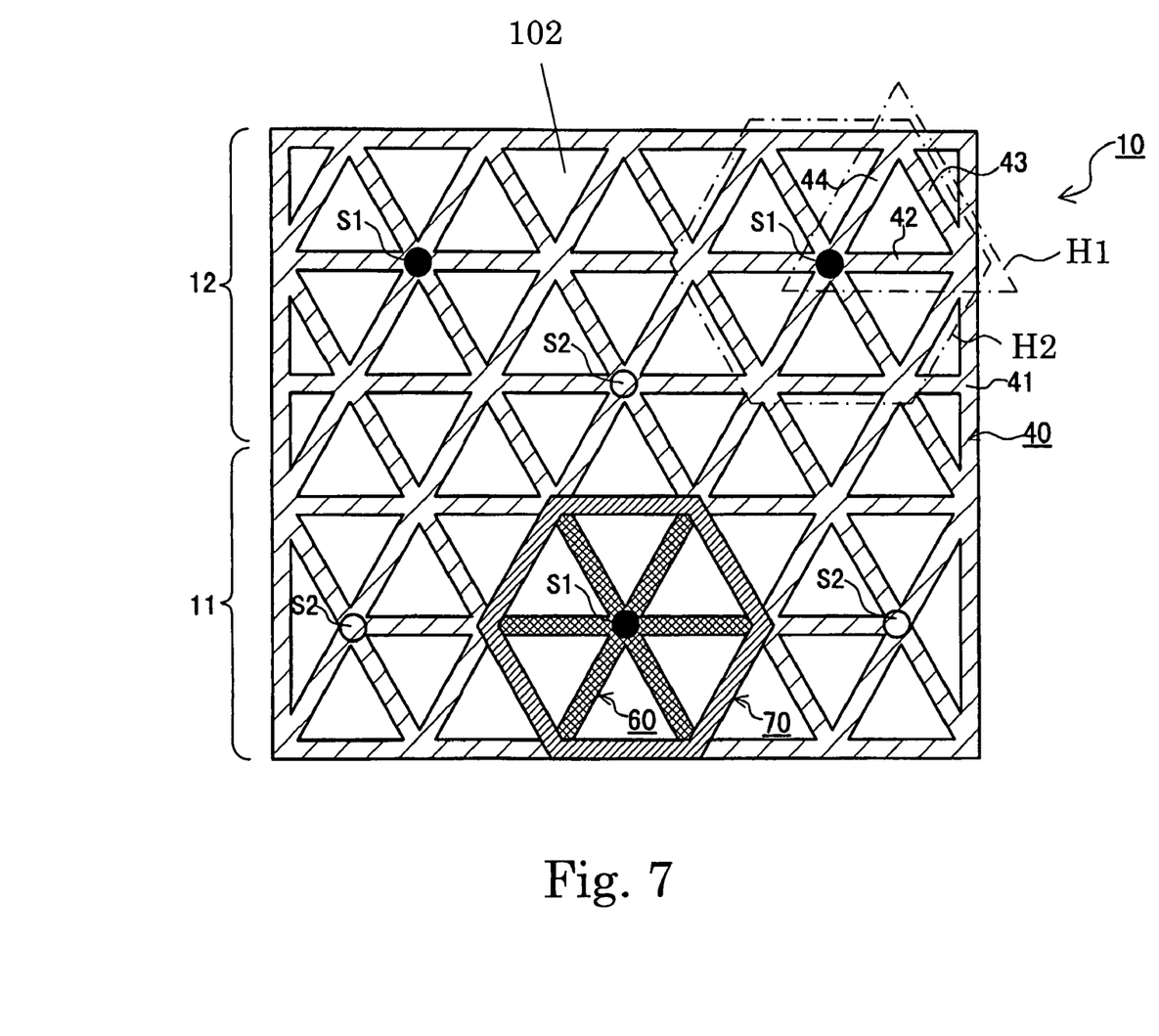
FIG. 7 is a plain view of a bed of the machine tool according to the fourth embodiment.
Figure 8:
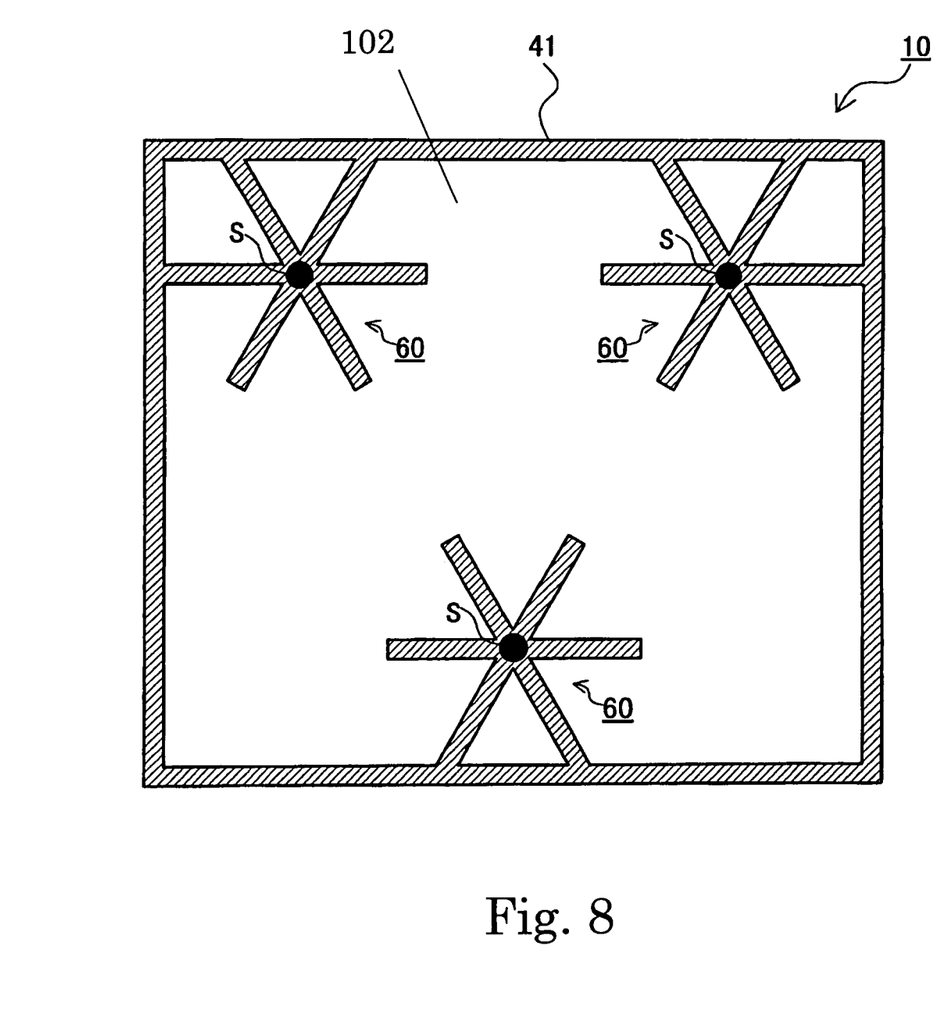
FIG. 8 is a plain view of a bed of a machine tool according to fifth embodiment; and, FIG. 9 is a plain view of a bed of a machine tool according to sixth embodiment.

The bed 10 of the machine tool 100 is made from cast iron or steel plates welded each other, and forms suitable ribs 40 to maintain enough strength as shown in FIG. 7. The ribs 40 comprise first ribs 41 circumscribing the bed 10, second ribs 42 arranged parallel to the Z-axis with suitable spaces, and third ribs 43 and fourth ribs 44 arranged at about ±60 degrees to the second ribs 42 with suitable spaces, wherein the ribs 40 form honeycombs. The honeycombs is made from a plurality of triangles made from the second, third and fourth ribs 42, 43 and 44, see H1 in FIG. 7. In the other view of the bed 10, the honeycombs is made from a plurality of hexagons made from the ribs 40, because each of the hexagons is made from six triangles, see H2 in FIG. 7. The bed 10 further comprises a ceiling 18 as the top of the bed 10 and a floor 102 as the bottom of the bed 10, wherein the ceiling 18 is supported over the floor 102 by the ribs 40. Namely, the ribs 40 stand whole height between the floor 102 and the ceiling 18, and support the ceiling 18. The ribs 40 may be formed on the floor 102 or on the ceiling 18 to strengthen the floor 102 or the ceiling 18. Or, the floor 102 may be omitted and the bottom of the ribs 40 may work as the floor of the bed 10. In further view of the bed 10, a plurality of prism-like props 70 are formed by the first, second and third ribs 41, 42 and 43, and a plurality of diagonal-like props 60 are formed by the second, third and fourth ribs 42, 43 and 44. Thus, the props 60 and 70 support the ceiling 18.

In the case that the machine tool 100 is fixed, the bed 10 is supported and leveled by three of main support members. The main support members are respectively located at support points S1 under the center of the props 60, 70 and support the bed 10. Meanwhile, because the two wheel head 30, 30 with the wheel spindles 36, 36 load more weight on the tool box-base 12 than the work saddle 20 does on the work saddle-base 11, center of gravity of the whole machine tool 100 is located in the tool box-base 12 in the horizontal plane. Moreover, during grinding the workpiece W, each of the wheel heads 30, 30 widely moves along the Z-axis. Therefore, one of the main support members is located at the main support point Si under the center of the work saddle-base 11, and each of the other main support members is located at each of the main support points S1 under each side of the tool box-base 12. Then, the bed 10 is supported and leveled by the main support members.

In addition, sub support members can be located under the bed 10 in order to compensate the strain of the bed 10 or to prevent the bed 10 from chattering during grinding, although the bed 10 is leveled by the three of main support members. Specifically, three sub support members support the bed 10 at three sub support points S2 under the bed 10. One of the sub support points S2 is located at center of gravity of the whole machine tool 100 in the horizontal plane, and each of the other points S2 is located at each side of the work saddle-base 11. The sub support members are also respectively located at the sub support points S2 under the center of the props 60, 70 and support the bed 10. The sub support members are auxiliary, so the load capacity of the sub support members can be minimized than the main support members.

In the fourth embodiment, the main or the sub support members, namely the main or the sub support points S1 or S2, are located under the center of the props 60, 70 and support the bed 10. Therefore, the bending moment about the center of the props 60, 70 of the bed is reduced so as to reduce the strain of the ceiling 18.

Fifth embodiment will be explained referring to FIG. 8. The same numerals in the fifth embodiment to that in the fourth embodiment of the present invention are same constructions except for a part so that the explanations of the same numerals are omitted. The bed 10 of the fifth embodiment comprises first ribs 41 circumscribing the bed 10 and diagonal-like props 60 suitable disposed on the floor 102. The ceiling 18 is supported by the diagonal-like props 60 so as to strength the whole bed 10. Further, the bed 10 is respectively supported by three support members at three support points S under the centers of the props 60.

Figure 9:
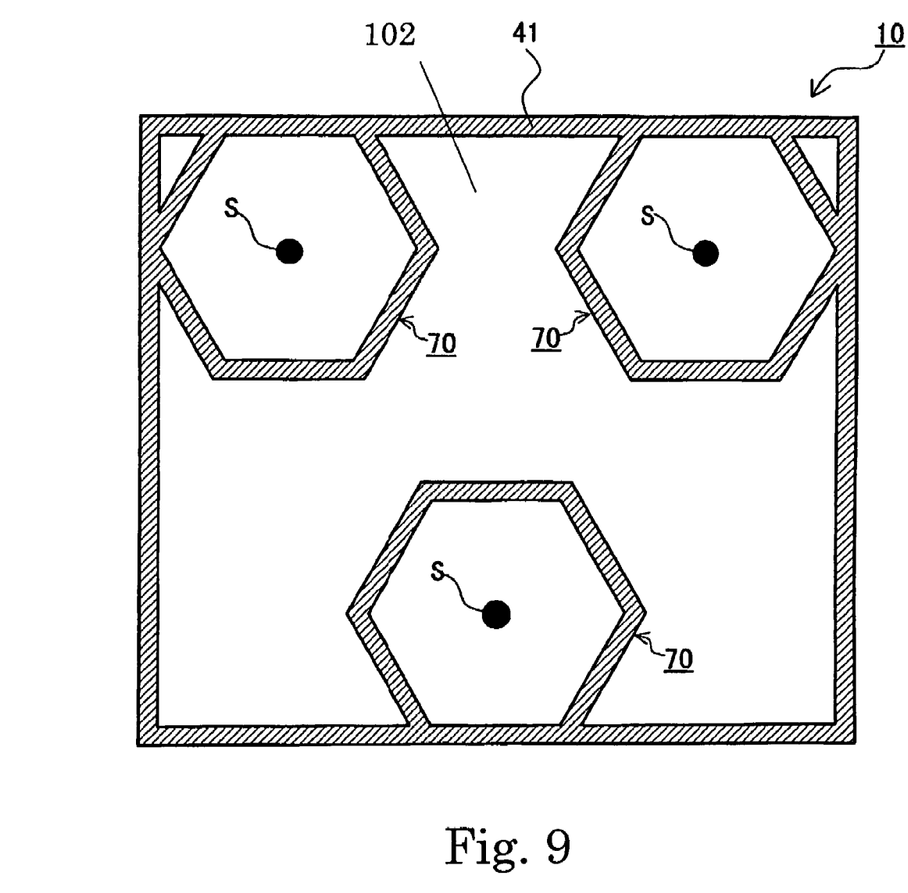

Sixth embodiment will be explained referring to FIG. 9. The same numerals in the sixth embodiment to that in the fourth embodiment of the present invention are same constructions except for a part so that the explanations of the same numerals are omitted. The bed 10 of the sixth embodiment comprises first ribs 41 circumscribing the bed 10 and prism-like props 70 suitable disposed on the floor 102. The ceiling 18 is supported by the prism-like props 70 so as to strength the whole bed 10. Further, the bed 10 is respectively supported by three support members at three support points S under the centers of the props 70.

Figure 10:
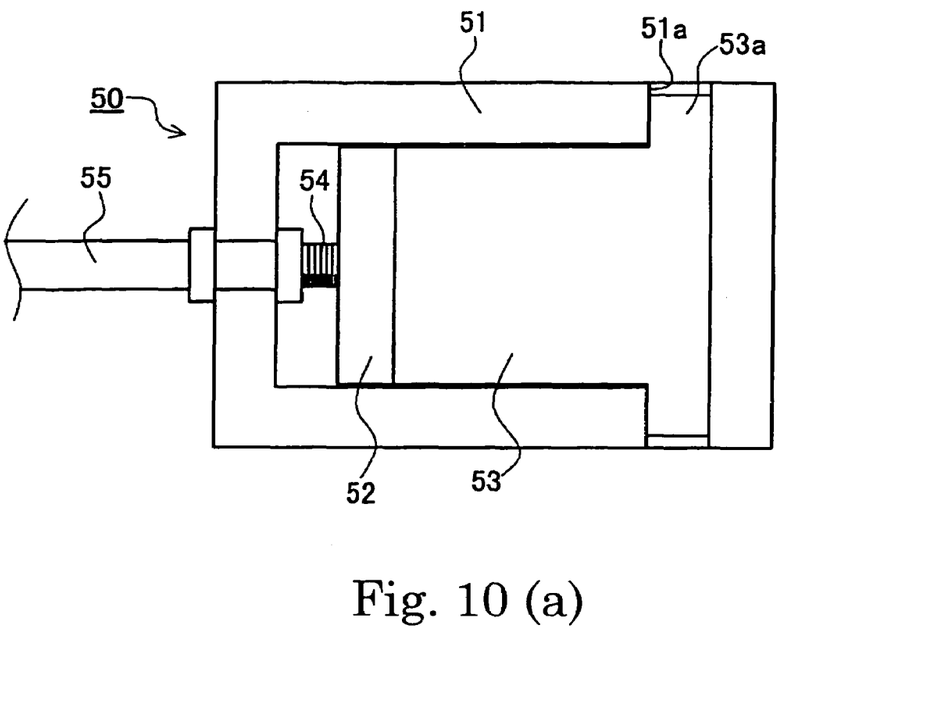
FIGS. 10(a) and 10(b) are a plain view and a side view of an example of a support member according to the present invention.

Now, referring to FIGS. 10(a) and 10(b), a support member 50 for the first to sixth embodiments will be explained. The support member 50 comprises a base 51, an adjusting bolt 54, a handle 55, a bottom block 54 and a top block 53. The shape of the base 51 is box-like. The adjusting bolt 54 rotatably penetrates the box-like base 51 horizontally and is connected to a handle 55 out of the base 51. The handle 55 is able to screw the adjusting bolt 54 which is screwed into a bottom block 52 disposed in the base 51. The top surface of the bottom block 52 is tapered and is horizontally moved by the adjusting bolt 54 in the base 51. The bottom surface of the top block 53 is tapered and is put on the bottom block 52. The base 51 has vertical slots 51a in which vertical protrusions of the top block 53a are fitted, so that the top block 53 is prevented from its horizontal movement. According to the tapered surface of the both blocks 52 and 53, the horizontal movement of the bottom block 52 vertically moves the top block 53. Namely, the support member 50 is generally called a "leveling block", wherein rotating the adjusting bolt 54 horizontally moves the bottom block 52 by dealing with the handle 55 so as to vertically move the top block 53.

Such support member 50 is able to precisely adjust the height, thereby the bed 10 is precisely leveled where the support member 50 is used in the above mentioned embodiments. And, where the support member 50 is used as the main and sub support member of the fourth embodiment, the strain or chattering of the bed 10 is suitably reduced. For the support member 50, there can be used not only the leveling block described above but also e.g. a jack. In the embodiments, three or six support members are used for fixing the bed 10, so the number of the support members is reduced than the prior art, for example, using sixteen support members.

According to the embodiments described above, although all of the support members are disposed under the diagonal-like props 60 or the prism-like props 70, at least one support member can be disposed there and the other support members do the other places. And, the bed 10 can be used for not only the grinding machine but also the other type machine tool, e.g. a machining center, a milling machine, a boring machine, a lathe or a drilling machine.

While the invention has been described in detail with reference to the preferred embodiment, it will be apparent to those skilled in the art that the invention is not limited to the present embodiment, and that the invention may be realized in various other embodiments within the scope of the claims. The example is shown herein under:

(1) The props supporting the ceiling can be differently formed each other. For example, there is formed a set of diagonal-like prop and prism-like prop at one region, and there are formed two diagonal-like props or prism-like props at other regions.

(2) Although the diagonal-like prop of the embodiments described above is made from three plates, the combination of the plates can be changed, for example, the number of the plates or the dimension of the plates. For the combination of the plates of the diagonal-like prop, the plates can intersect not only one axis but also plural axes, for example, some of the axes can be inclined. In this case, some plates are inclined against the vertical plane.

(3) The section of the prism-like prop can be changed to another polygon or loop, for example, a triangle, a square, a circle or an ellipse. Or, its dimension can be also exchanged, so the prism-like prop can be formed from a pyramid or a cone.

Furthermore, the technological components described in this specification and illustrated in the drawings can demonstrate their technological usefulness independently through various other combinations which are not limited to the combinations described in the claims made at the time of application. Moreover, the art described in this specification and illustrated in the drawings can simultaneously achieve a plurality of objectives, and is technologically useful by virtue of realizing any one of these objectives.

What is claimed is:

1. A machine tool comprising:
   a bed including a floor and a ceiling;
   means including three props connected at a lower side of the ceiling for supporting and rigidifying said ceiling;
   at least one tool box and work saddle arranged on an upper side of said ceiling; and
   wherein the props are arranged and located such that the center of gravity of said whole machine tool exists inside a horizontal triangle linking said props,
   wherein said bed includes a tool box-base for supporting said tool box and a work saddle-base for supporting said work saddle;
   wherein said tool box moves in one direction on said tool box-base and said work saddle traverses said direction on said work saddle-base;
   wherein one of said props is formed in the region of said tool box-base; and
   wherein the other props are formed in the region of both ends of said work saddle-base and spaced in a direction of movement of said work saddle such that a center of gravity of said whole machine tool is in a horizontal triangle linking said props.

2. A machine tool according to claim 1 further comprising: three support members respectively disposed directly under said props for supporting the same.

3. A machine tool according to claim 1 wherein each of said props is made from a hollow prism.

4. A machine tool according to claim 1 wherein each of said props is made from a plurality of plates crossing each other.

5. A machine tool according to claim 1 wherein at least one of said props is made from a combination of a prism and a plurality of plates crossing each other.

6. A machine tool according to claim 1 further comprising: at least one reinforcement rib formed beside said prop in direction of the movement of said tool box or said work saddle.

7. The machine tool according to claim 1, wherein each of said props is made from at least one of a hollow prism and a plurality of plates crossing each other; and
   three support members respectively disposed directly under said props for supporting the same.

8. A machine tool according to claim 7 wherein at least one of said props is made from a combination of a prism and a plurality of plates crossing each other.

9. A machine tool according to claim 7 further comprising:
   at least one reinforcement rib formed beside said prop in direction of the movement of said tool box or said work saddle.

10. A machine tool according to claim 1, wherein a spacing of the centers of the props is 0.25–L from a respective end of the work saddle-base, where L is the length of the work saddle-base.

11. A machine tool comprising:
    a bed including a floor and a ceiling;
    means including three props connected at a lower side of the ceiling for supporting and rigidifying said ceiling;
    at least one tool box and work saddle arranged on an upper side of said ceiling; and
    wherein the props are arranged and located such that the center of gravity of said whole machine tool exists inside a horizontal triangle linking said props,
    further comprising:
    two tool boxes;
    wherein said bed includes a tool box-base for supporting said tool boxes and a work saddle-base for supporting said work saddle;
    wherein both of said tool boxes move toward said work saddle and traverse said direction on said tool box-base;
    wherein one of said props is formed in the region of said work saddle-base; and
    wherein the other props are formed in the region of both ends of said tool box-base and spaced in a direction of movement of said tool boxes such that a center of gravity of said whole machine tool is in a horizontal triangle linking said props.

12. A machine tool according to claim 11 further comprising:
    three support members respectively disposed directly under said props for supporting the same.

13. A machine tool according to claim 11 wherein each of said props is made from a hollow prism.

14. A machine tool according to claim 11 wherein each of said props is made from a plurality of plates crossing each other.

15. A machine tool according to claim 11 wherein at least one of said props is made from a combination of a prism and a plurality of plates crossing each other.

16. A machine tool according to claim 11 further comprising:
    at least one reinforcement rib formed beside said prop in direction of the movement of said tool box or said work saddle.

17. The machine tool according to claim 11, wherein each of said props is made from at least one of a hollow prism and a plurality of plates crossing each other; and
    three support members respectively disposed directly under said props for supporting the same.

18. A machine tool according to claim 17 wherein at least one of said props is made from a combination of a prism and a plurality of plates crossing each other.

19. A machine tool according to claim 17 further comprising:
    at least one reinforcement rib formed beside said prop in direction of the movement of said tool box or said work saddle.

* * * * *